(12) United States Patent
Chen

(10) Patent No.: US 8,162,342 B2
(45) Date of Patent: Apr. 24, 2012

(54) SHOCK-ABSORBING SUSPENSION DEVICE FOR A WHEELED VEHICLE

(76) Inventor: Hsueh-Yi Chen, Tainan Hsien (TW)

(*) Notice: Subject to any disclaimer, the term of this patent is extended or adjusted under 35 U.S.C. 154(b) by 480 days.

(21) Appl. No.: 12/504,389

(22) Filed: Jul. 16, 2009

(65) Prior Publication Data
US 2011/0012321 A1 Jan. 20, 2011

(51) Int. Cl.
*B62K 21/08* (2006.01)
(52) U.S. Cl. ......... 280/276; 280/279; 280/283; 280/277
(58) Field of Classification Search ................. 280/276, 280/277, 283, 279
See application file for complete search history.

(56) References Cited

U.S. PATENT DOCUMENTS

| | | | | |
|---|---|---|---|---|
| 1,729,926 A | * | 10/1929 | Brusselbach | 74/485 |
| 4,179,135 A | * | 12/1979 | Slater | 280/276 |
| 4,741,545 A | * | 5/1988 | Honma et al. | 280/92 |
| 4,756,547 A | * | 7/1988 | Trema | 280/276 |
| 4,834,412 A | * | 5/1989 | Trema | 280/276 |
| 5,156,231 A | * | 10/1992 | Trema | 180/227 |
| 6,036,211 A | * | 3/2000 | Nohr | 280/276 |
| 6,349,784 B1 | * | 2/2002 | van der Heide | 180/219 |
| 7,699,330 B2 | * | 4/2010 | Chen | 280/276 |
| 7,744,107 B2 | * | 6/2010 | Chen | 280/276 |

FOREIGN PATENT DOCUMENTS

JP 03287482 A * 12/1991

* cited by examiner

*Primary Examiner* — Joanne Silbermann
*Assistant Examiner* — Daniel Yeagley
(74) *Attorney, Agent, or Firm* — Choate, Hall & Stewart LLP (57) ABSTRACT

A shock-absorbing suspension device includes a mounting rod adapted to be mounted on a frame of a wheeled vehicle, a wheel rod adapted to be mounted on a wheel axle to transmit a shock force generated as a result of movement of the vehicle over an uneven road surface, a counteracting member pivotally mounted on the wheel rod, upper and lower linking bars connected to the mounting rod and the counteracting member to form a four-bar linkage mechanism so as to dampen the shock force, and first and second arms pivotally connected to each other and respectively connected to the wheel rod and the mounting rod so as to stabilize movement of the mounting rod in an upright direction.

10 Claims, 8 Drawing Sheets

SHOCK-ABSORBING SUSPENSION DEVICE FOR A WHEELED VEHICLE

BACKGROUND OF THE INVENTION

1. Field of the Invention

This invention relates to a shock-absorbing suspension device for a wheeled vehicle, more particularly to a shock-absorbing suspension device for coupling a frame of a wheeled vehicle to a wheel axle.

2. Description of the Related Art

In co-pending U.S. patent application Ser. Nos. 12/038,865 and 12/039,142, the applicant disclosed a shock-absorbing suspension device for coupling a frame of a wheeled vehicle to a wheel axle so as to minimize impact of shock generated one the frame as a result of movement of the wheeled vehicle over an uneven road surface. The shock-absorbing suspension device generally includes a mounting rod adapted to be mounted on the frame, a wheel rod adapted to be mounted on the wheel axle, and a linkage mechanism which is disposed to couple the mounting rod to the wheel rod and which can sway in response to jerking movement of the wheel rod so as to dampen the shock transmitted to the mounting rod.

A steering column is mounted on the mounting rod, so that the mounting rod is swivelable to turn the wheel rod so as to control the advancing direction of the vehicle. Since the entire linkage mechanism has to be turned together with the mounting rod during a steering operation, a relatively large force needs to be applied to the mounting rod.

SUMMARY OF THE INVENTION

An object of the present invention is to provide a shock-absorbing suspension device which can effectively dampen shocks transmitted to a frame of a wheeled vehicle and which permits a smooth and effortless steering operation.

According to embodiments of this invention, the shock-absorbing suspension device includes a mounting rod adapted to be mounted on a frame of a wheeled vehicle and having upper and lower coupled ends; a wheel rod adapted to be mounted on a wheel axle to transmit upwards from the wheel axle a shock force generated as a result of movement of the vehicle over an uneven road surface; a counteracting member pivotally mounted on an upper segment of the wheel rod and having upper and lower linked ends; an upper linking bar coupling the upper coupled end to the upper linked end; a lower linking bar coupling the lower coupled end to the lower linked end such that the mounting rod, the counteracting member, and the upper and lower linking bars cooperatively form a four-bar linkage mechanism to dampen the shock force transmitted from the wheel rod to the mounting rod; and first and second arms pivotally connected to each other and respectively connected to the wheel rod and the mounting rod so as to stabilize movement of the mounting rod in an upright direction.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION

Before the present invention is described in greater detail, it should be noted that same reference numerals have been used to denote like elements throughout the specification.

Referring to FIGS. 1 to 4, a first embodiment of a shock-absorbing suspension device is shown to comprise a mounting rod 3, a wheel rod 4, two front linking bars 30, 40, a counteracting member 5, upper and lower linking bars 61, 62, a first arm 7, a second arm 8, a connecting rod 9, and a spring-loaded shock-absorber 23.

The mounting rod 3 has a mounting segment 32 that is adapted to be mounted on a frame 21 of a wheeled vehicle 2, such as a motorcycle, and a coupling segment 33 that extends from the mounting segment 32 in an upright direction, and that has upper and lower coupled ends 331, 332 disposed respectively proximate to and distal from the mounting segment 32. A cantilevered limb 31 extends forwardly from the mounting segment 32 in a longitudinal direction transverse to the upright direction to terminate at a forward end 311 that is adapted to be connected to a steering handle 24 of the wheeled vehicle 2. In this embodiment, the intersecting angle ( ) between the cantilevered limb 31 and the mounting segment 32 is 90°.

The wheel rod 4 has a fork-type lower segment 41 which is adapted to be mounted on a wheel axle 221 of a wheel 22 of the wheeled vehicle 2 to transmit upwards from the wheel axle 221 a shock force generated as a result of movement of the wheeled vehicle 2 over an uneven road surface, a swivelable segment 42 extending from the lower segment 41 along a steering axis in the upright direction to terminate at an upper pivoted end 421, and an upper segment 43 which surrounds the swivelable segment 42, which extends from the lower segment 41 in the upright direction, and which is jerked upwards and downwards when the shock force is transmitted upwards thereto. The upper segment 43 is disposed forwardly of the mounting rod 3 in the longitudinal direction, and has upper and lower regions 431, 432.

The front linking bars 30, 40 are pivotally connected to each other, are disposed to couple the steering handle 24 at the forward end 311 to the upper pivoted end 421 such that the steering handle 24 is in line with the steering axis of the swivelable segment 42. Thus, a steering force applied to the steering handle 24 is transmitted to the lower segment 41 through the front linking bars 30, 40 during a steering operation.

The counteracting member 5 includes a pivoted segment 51 pivotally mounted on the upper region 431 about a first pivot axis in a transverse direction transverse to both the upright and longitudinal directions, and a counteracting segment 52 extending rearwardly from the pivoted segment 51 beyond the mounting rod 3 to terminate at a coupler area 520. The coupler area 520 extends in the upright direction to terminate at upper and lower linked ends 521, 522.

The upper and lower linking bars 61, 62 have the same length. The upper linking bar 61 is disposed to couple the upper linked end 521 to the upper coupled end 331, and the lower linking bar 62 is disposed to couple the lower linked end 522 to the lower coupled end 332 to thereby form a four-bar linkage mechanism. Thus, upward or downward jerking movement of the wheel rod 4 when the wheel 22 is moving over an uneven road surface results in downward or upward movement of the coupler area 520 of the counteracting segment 52 about the first pivot axis, thereby dampening the shock force transmitted to the counteracting segment 52 and in turn to the mounting rod 3. In this embodiment, an included angle (θ) (see FIG. 4) between a line intersecting the first pivot axis and the upper linked end 521 and a line intersecting the first pivot axis and the lower linked end 522 is 40°.

The first arm 7 has a first front end 71 connected to the lower region 432, and a bearing portion 72 extending rearwardly from the first front end 71 to terminate at a first anchoring end 73. The second arm 8 has a second front end 81 connected to the coupling segment 33, and a linked portion 82 which extends from the second front end 81 rearwardly to terminate at a second anchoring end 83, and which is pivotably connected to the bearing portion 72 about a second pivot axis to thereby form a motion stabilizing mechanism. Thus, upward or downward jerking movement of the wheel rod 4 results in movement of the bearing portion 72 with the upper segment 43 and turning of the bearing portion 72 about the second pivot axis relative to the linked portion 82, thereby stabilizing the movement of the mounting rod 3. In this embodiment, the first anchoring end 73 is pivotally connected to the second anchoring end 83 about the second pivot axis. The second front end 81 is pivotally connected to both the lower coupled end 332 and the lower linking bar 62. The spring-loaded shock absorber 23 is disposed between the upper linking bar 61 and the first arm 7 so as to provide a biasing force to counteract the shock force transmitted from the wheel rod 4 to the mounting rod 3.

The connecting rod 9 interconnects the motion stabilizing mechanism and the four-bar linkage mechanism such that the counteracting segment 52 can counteract turning movement of the bearing portion 72 about the second pivot axis. In this embodiment, the connecting rod 9 has two ends respectively connected to the upper linked end 521 and the first anchoring end 73.

Figure 1:
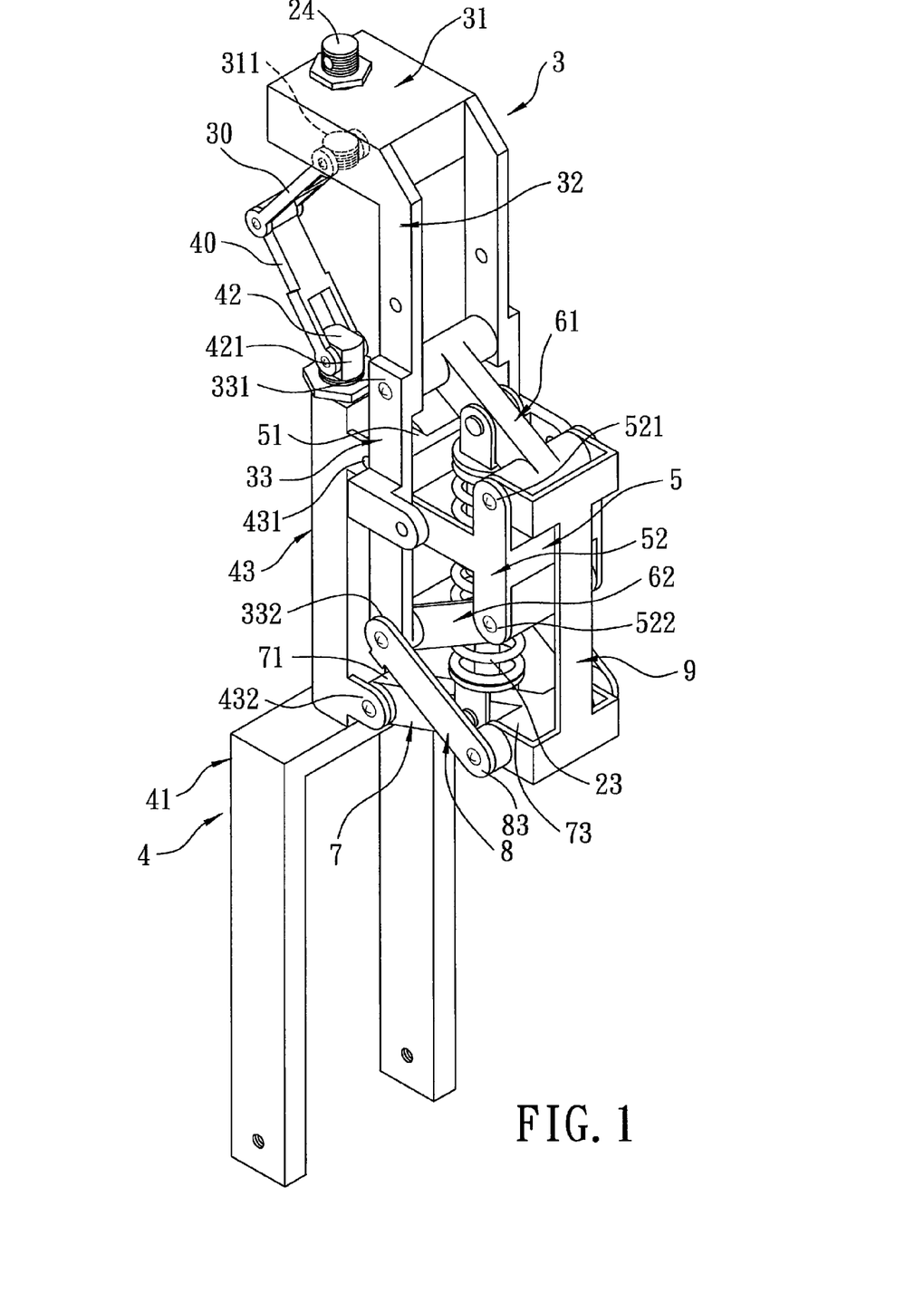
FIG. 1 is a perspective view of a first embodiment of a shock-absorbing suspension device.
Figure 2:
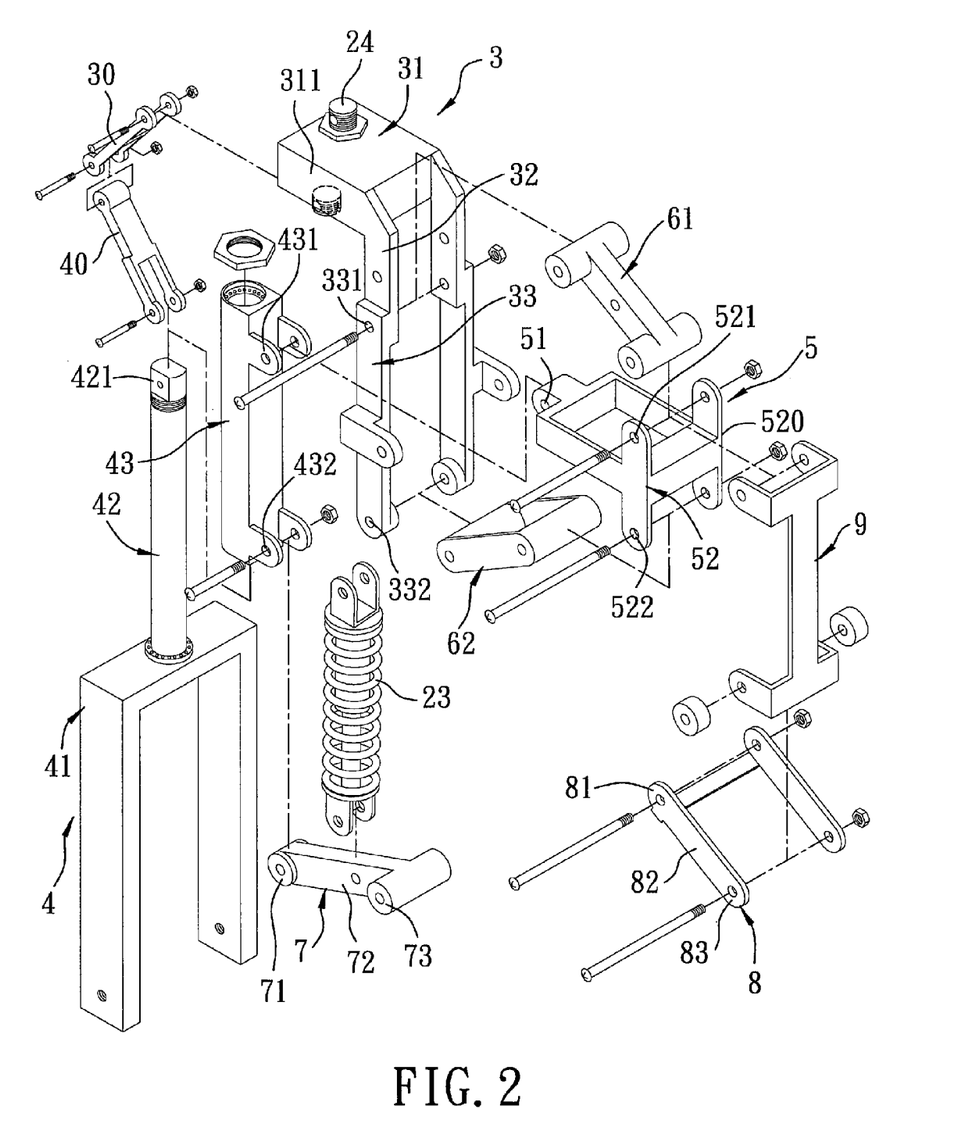
FIG. 2 is an exploded perspective view of the first embodiment.
Figure 3:
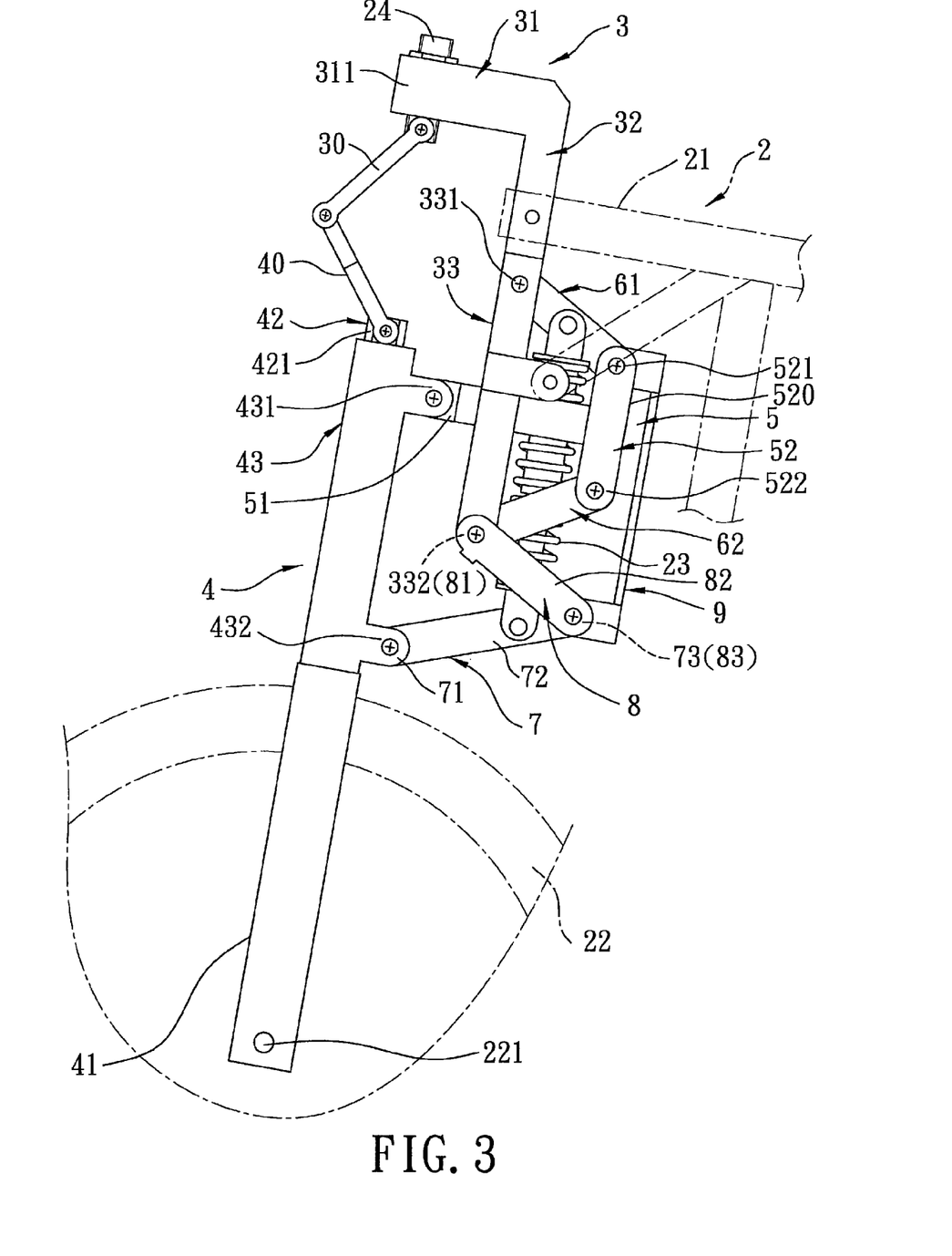
FIG. 3 is a schematic side view of the first embodiment.
Figure 4:
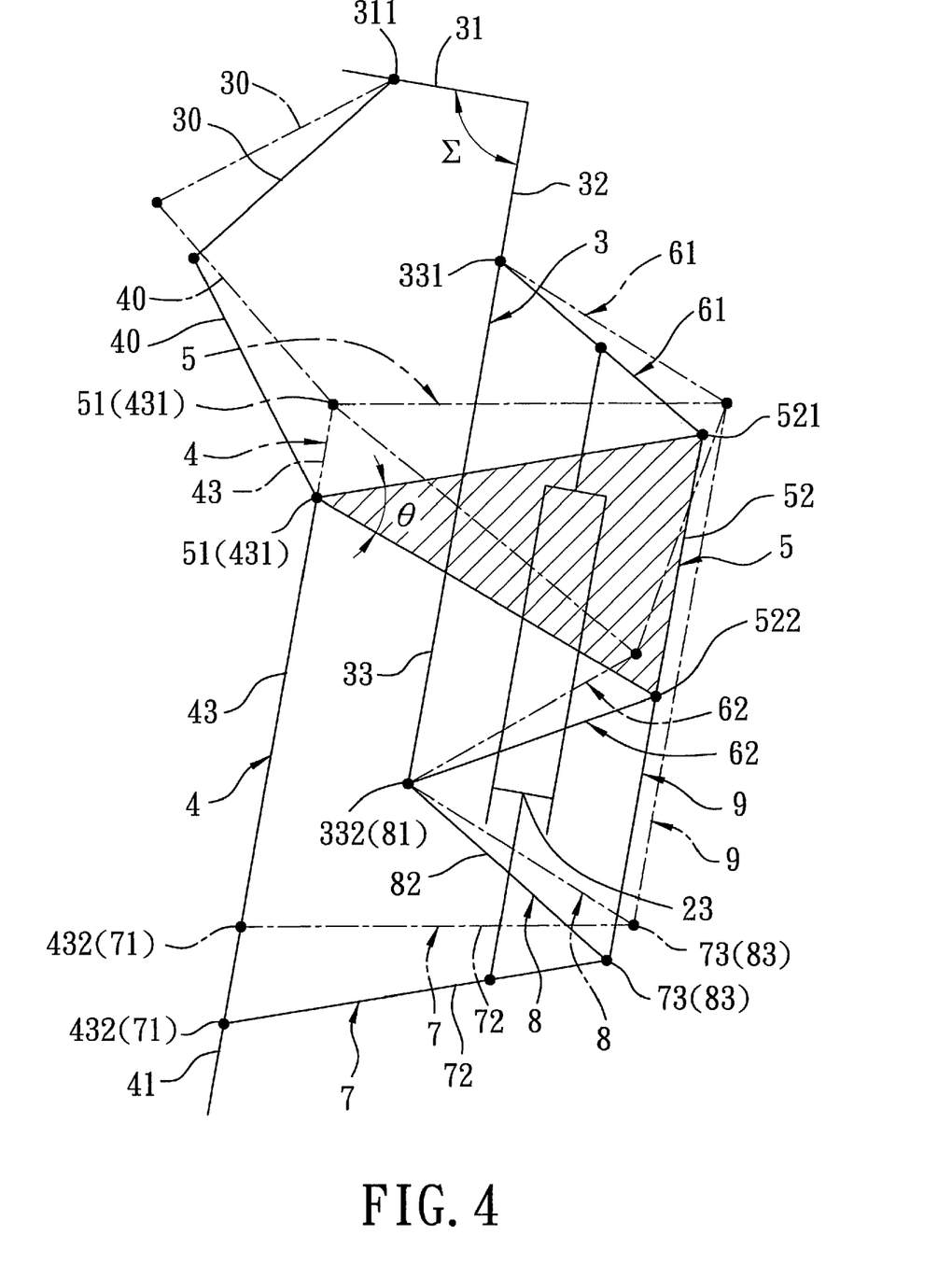
FIG. 4 is a schematic diagram of the first embodiment.

FIG. 4 shows the suspension device of an embodiment of this invention in a state of use, as indicated by solid lines. In this state, the counteracting segment 52 partially overlaps the connecting rod 9 and the mounting rod 3. In addition, the wheel rod 4 and the connecting rod 9 are kept parallel to one another, the upper linking bar 61 extends parallel to the second arm 8, and the first arm 7 extends parallel to the line intersecting the first pivot axis and the upper linked end 521, thereby forming two parallelogram-shaped linkage mechanisms. When the wheel 22 moves over a bumpy road surface, as shown in FIG. 3, the shock force experienced by the wheel axle 221 is transmitted to the suspension device. As indicated by dotted lines in FIG. 4, the first arm 7 and the pivoted segment 51 are moved with the wheel rod 3 such that the second arm 8, the counteracting segment 52, and the upper and lower linking bars 61,62 are swung, thereby dampening the shock force transmitted to the mounting rod 3. Moreover, through compression of the spring-loaded shock absorber 23, the impact of the shock force on the mounting rod 3 can be minimized. In addition, by means of the first and second arms 7,8 and the connecting rod 9, the movement of the mounting rod 3 can be stabilized and the mounting rod 3 can keep parallel to the wheel rod 4, i.e., the steering axis.

Moreover, when a steering force is applied to the steering handle 24 to turn the wheeled vehicle 2, the lower segment 41 can be turned with the front linking bars 30,40 about the steering axis while the mounting rod 3, the four-bar linkage mechanism, the motion stabilizing mechanism, and the spring-loaded shock absorber 23 remain substantially immobile. Thus, the steering force required to smoothly steer the vehicle is relatively small.

Figure 5:
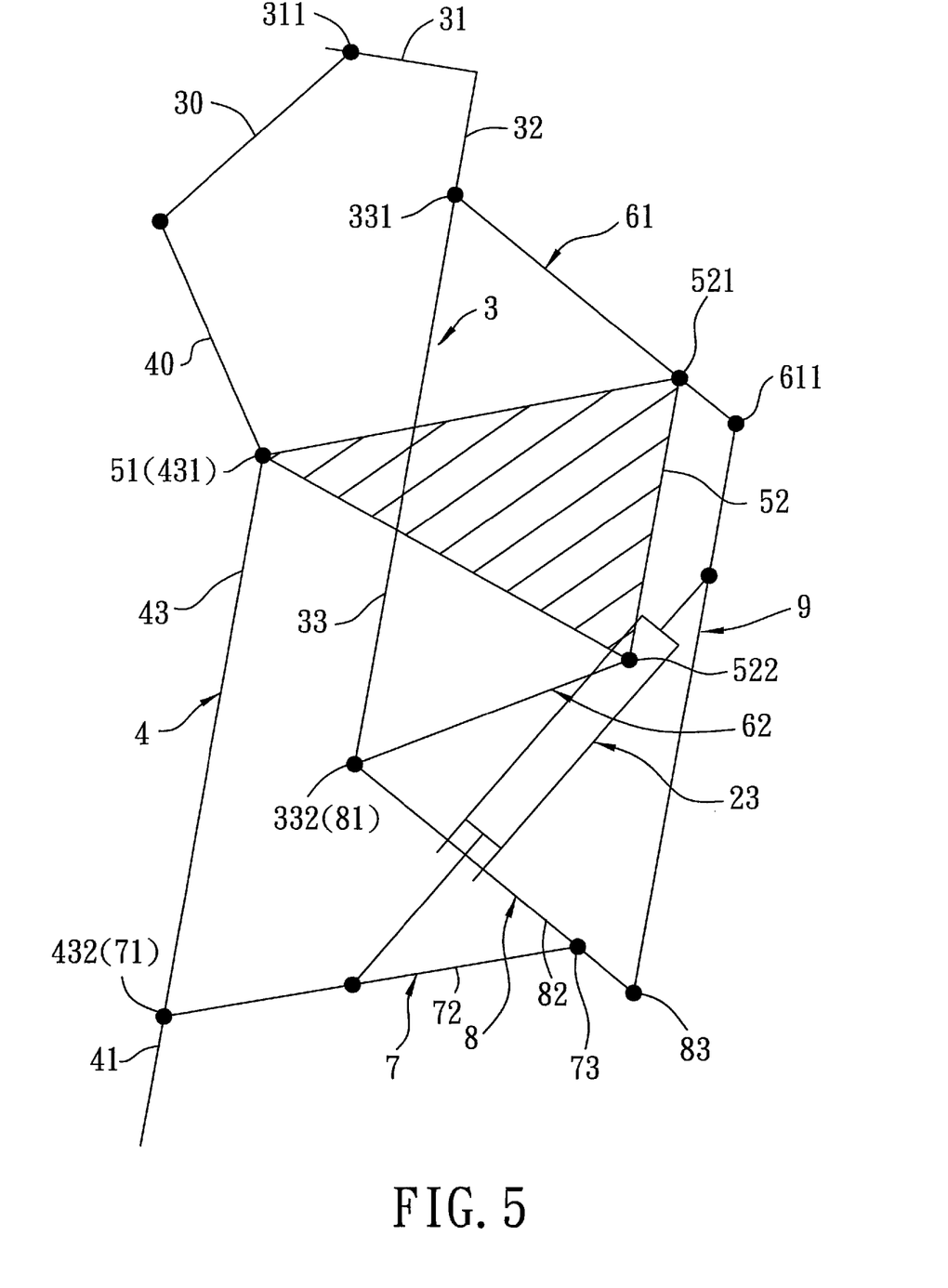
FIGS. 5 to 8 respectively are schematic diagrams of second to fifth embodiments of a shock-absorbing suspension device.

Referring to FIG. 5, a second embodiment of the shock-absorbing suspension device is similar to the first embodiment in construction. In this embodiment, the connecting rod 9 is disposed rearwardly of the counteracting member 5. Specifically, the upper linking bar 61 is configured to extend lengthwise and beyond the upper linked end 521 to terminate at a rear linking end 611. The first anchoring end 73 is pivotally connected to the linked portion 82 about the second pivot axis. The connecting rod 9 has two ends respectively connected to the rear linking end 611 and the second anchoring end 83. In addition, the spring-loaded shock absorber 23 is connected to the connecting rod 9 and the first arm 7.

Figure 6:
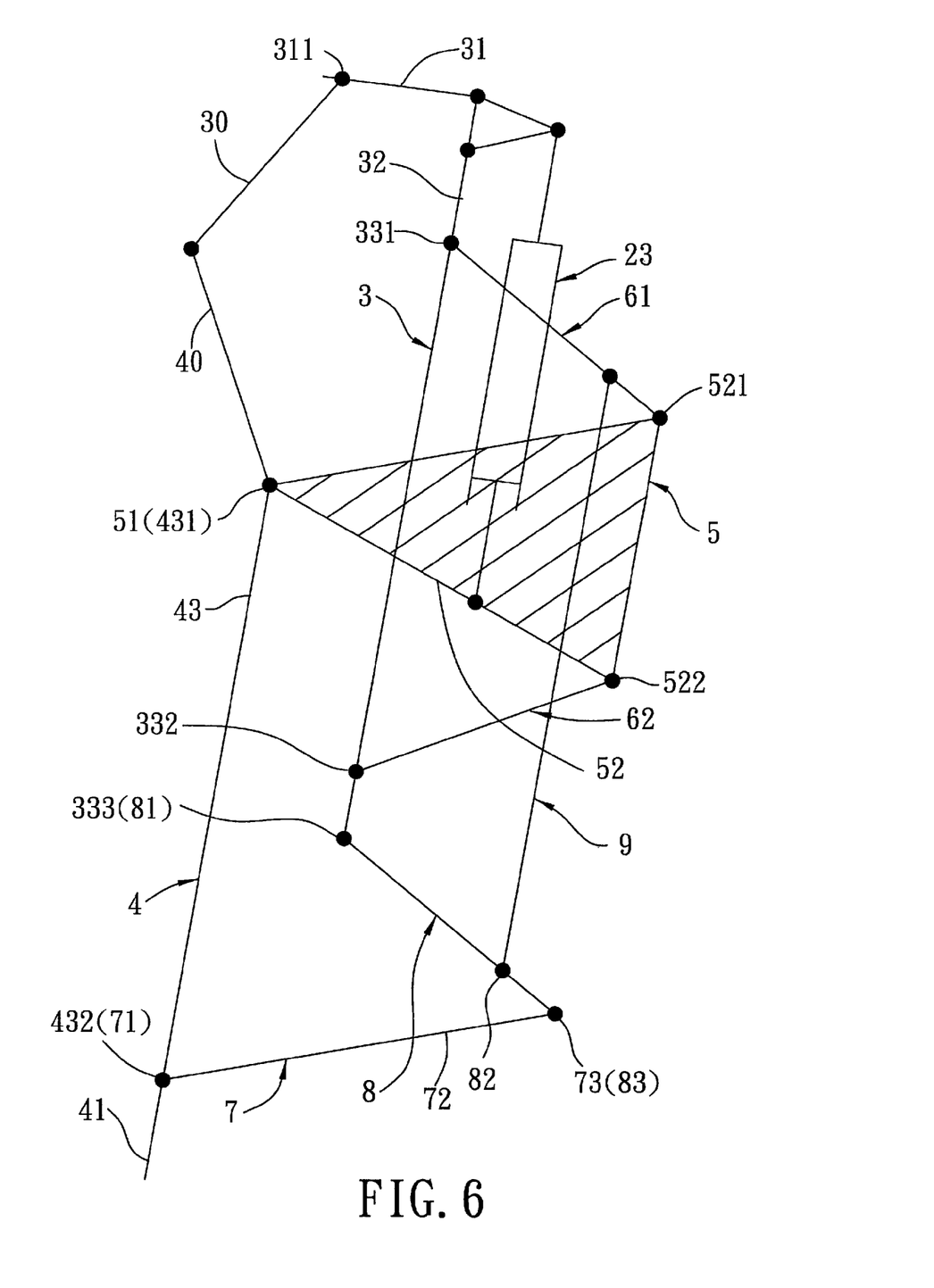

Referring to FIG. 6, a third embodiment of the shock-absorbing suspension device is similar to the first embodiment in construction. In this embodiment, the first anchoring end 73 of the first arm 7 is pivotally connected to the second anchoring end 83 of the second arm 8 about the second pivot axis. The second front end 81 of the second arm 8 is connected to a downwardly extending portion 333 of the coupling segment 33 which extends downwardly from the lower end 332. The connecting rod 9 is disposed forwardly of a line intersecting the upper and lower linked ends 521, 522, and has two ends respectively connected to the upper linking bar 61 and the linked portion 82. In addition, the spring-loaded shock absorber 23 is connected to the mounting segment 32 and the counteracting segment 52.

Figure 7:
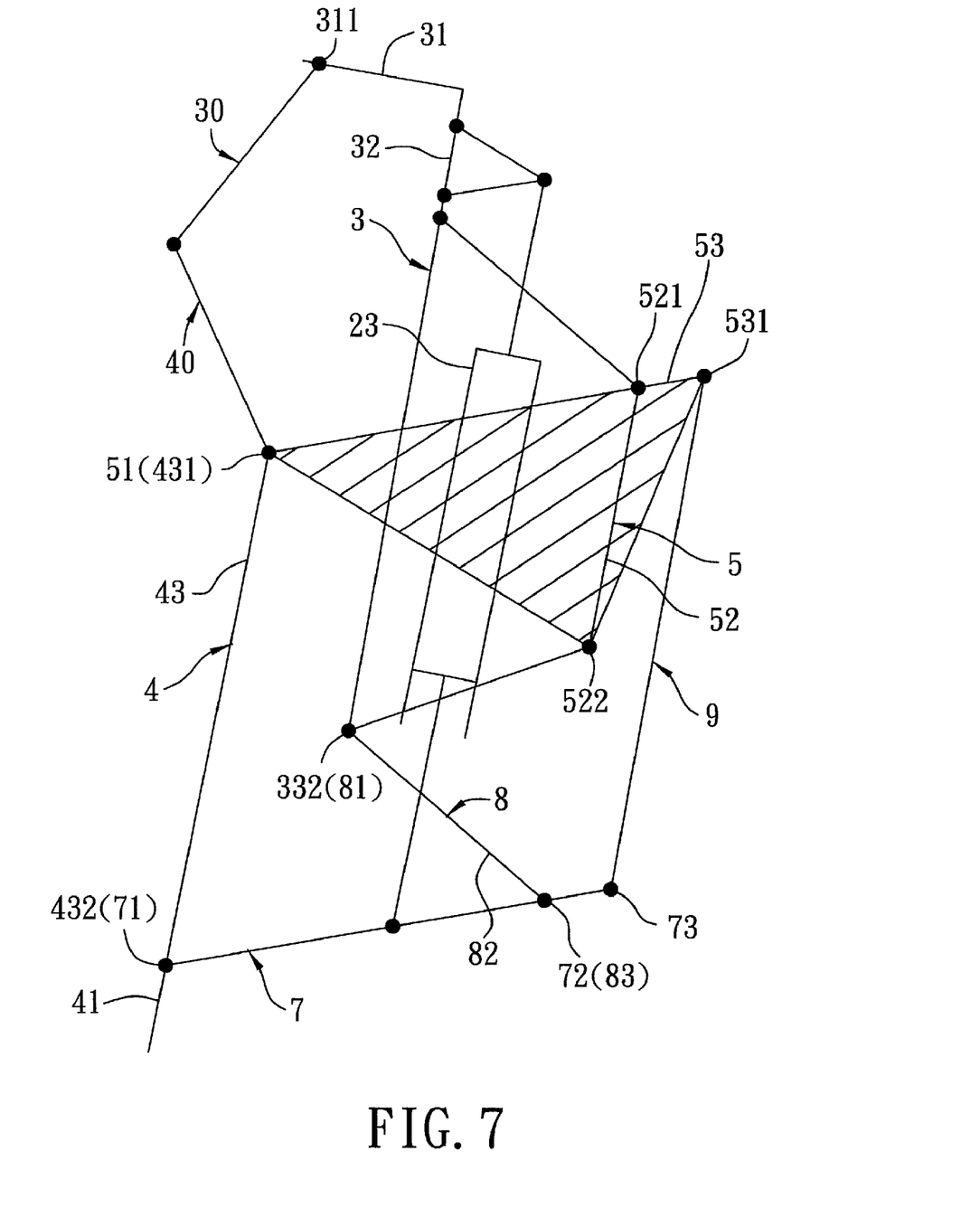

Referring to FIG. 7, a fourth embodiment of the shock-absorbing suspension device is similar to the first embodiment in construction. In this embodiment, the connecting rod 9 is disposed rearwardly of the counteracting member 5. Specifically, the second anchoring end 83 of the second arm 8 is pivotally connected to the bearing portion 72 of the first arm 7 about the second pivot axis. The counteracting segment 52 includes a rear limb 53 which extends rearwardly from the upper linked end 521 and along a line intersecting the first pivot axis to terminate at a rear connecting end 531. The connecting rod 9 has two ends respectively connected to the rear connecting end 531 and the first anchoring end 73 of the first arm 7. In addition, the spring-loaded shock absorber 23 is connected to the mounting segment 32 and the bearing portion 72.

Figure 8:
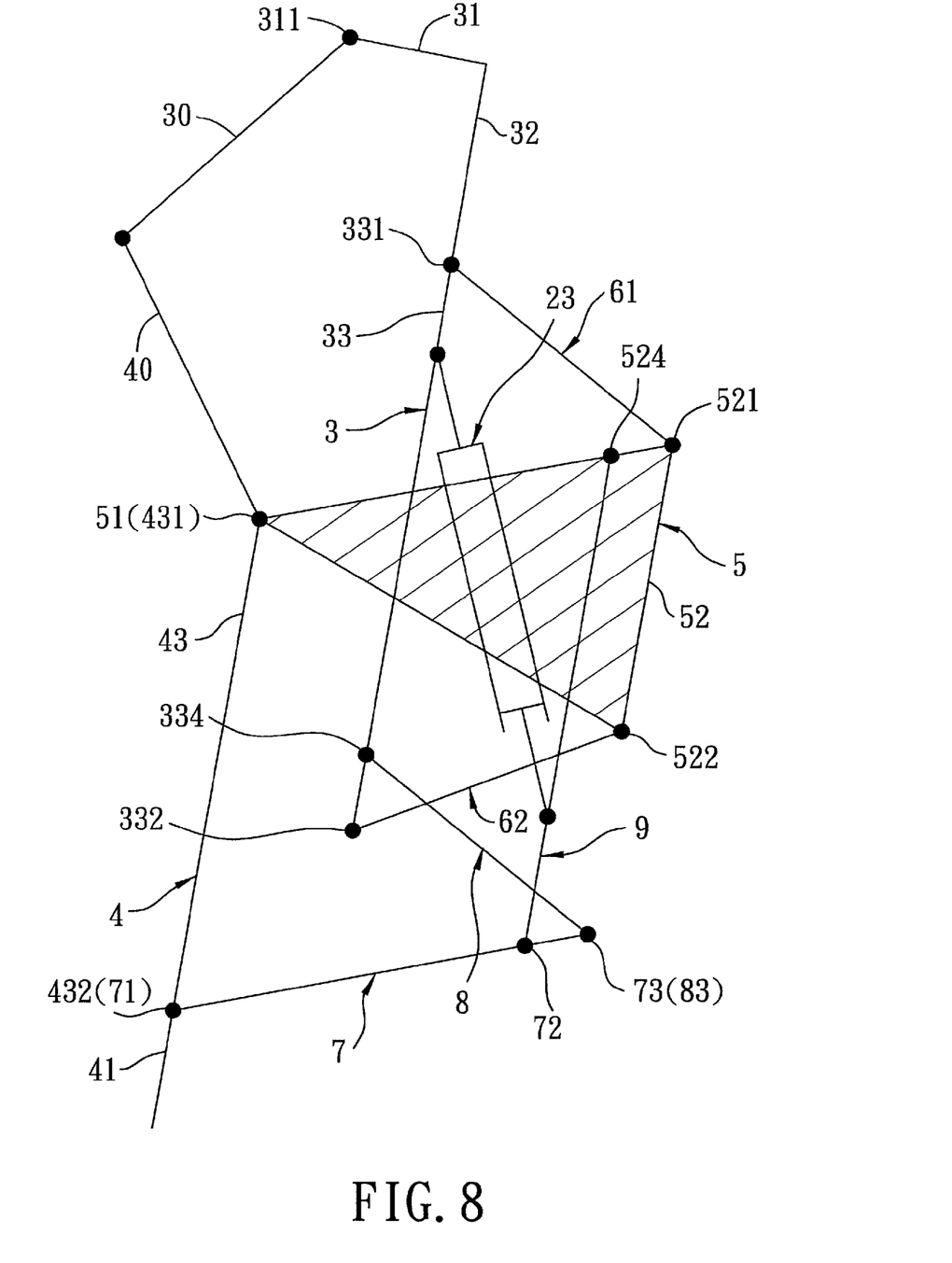

Referring to FIG. 8, a fifth embodiment of the shock-absorbing suspension device is similar to the first embodiment in construction. In this embodiment, the connecting rod 9 is disposed forwardly of the line intersecting the upper and lower linked ends 521,522. Specifically, the first anchoring end 73 of the first arm 7 is pivotally connected to the second anchoring end 83 of the second arm 8 about the second pivot axis. The second front end 81 of the second arm 8 is connected to a middle portion 334 between the upper and lower coupled ends 331,332 and disposed proximate to the lower coupled end 332. The connecting rod 9 has two ends respectively connected to the bearing portion 72 and the counteracting segment 52 at a pivoted area 524 which is disposed proximate to the upper linked end 521 and which is aligned with the upper linked end 521 along the line intersecting the upper linked end 521 and the first pivot axis. In addition, the spring-loaded shock absorber 23 is connected to the coupling segment 33 and the connecting rod 9.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A shock-absorbing suspension device adapted to couple a frame of a wheeled vehicle to a wheel axle, comprising:
   a mounting rod which has a mounting segment that is adapted to be mounted on the frame, and a coupling segment that extends from said mounting segment in an upright direction, and that has upper and lower coupled ends disposed respectively proximate to and distal from said mounting segment;
   a wheel rod having a lower segment which is adapted to be mounted on the wheel axle to transmit upwards from the wheel axle a shock force generated as a result of movement of the wheeled vehicle over an uneven road surface, and an upper segment which extends from said lower segment in the upright direction and which is jerked upwards and downwards when the shock force is transmitted upwards thereto, and which has upper and lower regions, said upper segment being disposed forwardly of said mounting rod in a longitudinal direction transverse to the upright direction;
   a counteracting member including
      a pivoted segment which is pivotally mounted on said upper region of said upper segment about a first pivot axis in a transverse direction transverse to both the upright and longitudinal directions, and
      a counteracting segment which extends rearwardly from said pivoted segment beyond said mounting rod to terminate at a coupler area, said coupler area extending in the upright direction to terminate at upper and lower linked ends;
   upper and lower linking bars, said upper linking bar being disposed to couple said upper linked end to said upper coupled end, said lower linking bar being disposed to couple said lower linked end to said lower coupled end to thereby form a four-bar linkage mechanism such that upward or downward jerking movement of said upper segment results in downward or upward movement of said coupler area of said counteracting segment about the first pivot axis, thereby dampening the shock force transmitted to said counteracting segment and in turn to said mounting rod;
   a first arm having a first front end connected to said lower region, and a bearing portion extending rearwardly from said first front end to terminate at a first anchoring end; and
   a second arm having a second front end connected to said coupling segment, and a linked portion which extends from said second front end rearwardly to terminate at a second anchoring end, and which is pivotably connected to said bearing portion about a second pivot axis to thereby form a motion stabilizing mechanism such that upward or downward jerking movement of said upper segment results in movement of said bearing portion with said upper segment and turning of said bearing portion about the second pivot axis relative to said linked portion so as to stabilize movement of said mounting rod.

2. The shock-absorbing suspension device according to claim 1, further comprising a connecting rod which interconnects said motion stabilizing mechanism and said four-bar linkage mechanism such that said counteracting segment counteracts turning movement of said bearing portion about the second pivot axis.

3. The shock-absorbing suspension device according to claim 2, wherein said first anchoring end of said first arm is pivotally connected to said second anchoring end of said second arm about the second pivot axis, said connecting rod having two ends respectively connected to said upper linked end and said first anchoring end.

4. The shock-absorbing suspension device according to claim 2, wherein said upper linking bar is configured to extend lengthwise and beyond said upper linked end to terminate at a rear linking end, said connecting rod having two ends respectively connected to said rear linking end and said second anchoring end.

5. The shock-absorbing suspension device according to claim 2, wherein said first anchoring end of said first arm is pivotally connected to said second anchoring end of said second arm about the second pivot axis, said connecting rod having two ends respectively connected to said upper linking bar and said linked portion.

6. The shock-absorbing suspension device according to claim 2, wherein said counteracting segment includes a rear limb which extends rearwardly from said upper linked end and along a line intersecting the first pivot axis to terminate at a rear connecting end, said connecting rod having two ends respectively connected to said rear connecting end and said first anchoring end.

7. The shock-absorbing suspension device according to claim 2, wherein said first anchoring end of said first arm is pivotally connected to said second anchoring end of said second arm about the second pivot axis, said connecting rod having two ends respectively connected to said bearing portion and said counteracting segment at a pivoted area which is disposed proximate to said upper linked end and which is aligned with said upper linked end along a line intersecting said upper linked end and the first pivot axis.

8. The shock-absorbing suspension device according to claim 2, further comprising a spring-loaded shock-absorber disposed between any two of said motion stabilizing mechanism, said connecting rod, said four-bar linkage mechanism, and said mounting rod so as to provide a biasing force against the shock force transmitted from said wheel rod to said mounting rod.

9. The shock-absorbing suspension device according to claim 1, wherein said wheel rod has a swivelable segment which is surrounded by said upper segment and which extends from said lower segment along a steering axis in the upright direction to terminate at an upper pivoted end;
   said shock-absorbing suspension device further comprising:
      a cantilevered limb which extends forwardly from said mounting segment to terminate at a forward end that is spaced apart from said upper region and that is adapted to be connected to a steering handle of the wheeled vehicle; and
      two front linking bars which are pivotally connected to each other, which are disposed to couple said forward end to said upper pivoted end such that a steering force applied to the steering handle is transmitted to said lower segment through said front linking bars.

10. The shock-absorbing suspension device according to claim 1, wherein said second front end of said second arm is pivotally connected to both said lower coupled end and said lower linking bar.

* * * * *